(12) United States Patent
Li et al.

(10) Patent No.: US 6,251,359 B1
(45) Date of Patent: Jun. 26, 2001

(54) METHOD FOR OXIDIZING HYDROGEN SULFIDE TO ELEMENTAL SULFUR

(75) Inventors: Kuo-Tseng Li, Taichung; Ren-Hai Chi, Taichung Hsien, both of (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/277,301

(22) Filed: Mar. 26, 1999

(30) Foreign Application Priority Data

Aug. 4, 1998 (TW) ................................................ 87112856

(51) Int. Cl.⁷ ........................... B01D 53/52; C01B 17/04
(52) U.S. Cl. .................................... 423/573.1; 423/576.8; 502/517
(58) Field of Search .............................. 423/576.8, 573.1; 502/517

(56) References Cited

U.S. PATENT DOCUMENTS

| 4,444,908 | * | 4/1984 | Hass et al. ............................. 502/247 |
| 5,597,546 | * | 1/1997 | Li et al. .............................. 423/573.1 |
| 5,653,953 |   | 8/1997 | Li et al. .............................. 423/576.8 |
| 5,700,440 | * | 12/1997 | Li et al. ................................. 423/231 |
| 5,948,382 | * | 9/1999 | Li et al. .............................. 423/573.1 |

OTHER PUBLICATIONS

P.F.M.T. van Nisselrooy, et al., "Superclaus Reduces $SO_2$ Emission by the Use of a new Selective Oxidation Catalyst," *Catalysis Today,* No., 16, Elsevier Science Publishers B.V., 1993, pp. 263–271.

R. Kettner, et al., "New Claus Tail–gas Process Proved in German Operation," *Technology,* Oil and & Journal, Jan. 11, 1988, pp. 63–66.

* cited by examiner

*Primary Examiner*—Steven P. Griffin
*Assistant Examiner*—Timothy C. Vanoy
(74) *Attorney, Agent, or Firm*—Fay, Sharpe, Fagan, Minnich & McKee, LLP

(57) ABSTRACT

A method for selectively oxidizing hydrogen sulfide to elemental sulfur is disclosed. The elemental sulfur can be effectively recovered from a gas mixture containing hydrogen sulfide in the presence of a multi-component catalyst. The multi-component catalyst includes an antimony-containing substance and a vanadium-and-magnesium-containing material. The antimony containing substance may be antimonous oxide ($Sb_2O_3$) or antimony tetraoxide ($\alpha$-$Sb_2O_4$), and the vanadium and magnesium containing material may be magnesium pyrovanadate ($Mg_3V_2O_8$) or $Mg_2V_2O_7$.

13 Claims, No Drawings

METHOD FOR OXIDIZING HYDROGEN SULFIDE TO ELEMENTAL SULFUR

FIELD OF THE INVENTION

The present invention is related to a method for oxidizing hydrogen sulfide to elemental sulfur, and more particularly to a method for recovering elemental sulfur from a gas mixture containing hydrogen sulfide.

BACKGROUND OF THE INVENTION

In the petroleum refinery process for producing various fuel oil such as gasoline, diesel, kerosene, etc., the sulfur in the crude oil is removed as hydrogen sulfide gas by hydrodesulfurization process. The highly toxic hydrogen sulfide gas is then converted to elemental sulfur in sulfur-recovery plants or so-called Claus plants. During the last two decades, a great number of Claus tail-gas treating (TGT) processes have been developed to increase the total sulfur-recovery efficiency. Conventional Claus TGT processes involve a hydrogen sulfide absorption step, in which a tail gas containing unreacted hydrogen sulfide is introduced into an alkaline bath. Removing the last percentages of sulfur by means of these conventional Claus TGT processes is relatively expensive, both in terms of capital investment cost and energy consumption.

Recently, in order to avoid the shortcomings of these solution-absorption type Claus TGT processes, two dry types of TGT processes have been developed, that is, Mobil-direct-oxidation process developed by Mobil AG Company in Germany (Oil and Gas Journal, 86, p.63, 1988) and Super-Claus Process developed by Comprimo Company in Netherlands (Catalysis Today, 16, p263–271, 1993), both of which comprise a step of recovering elemental sulfur from Claus tail gas by selective oxidation of hydrogen sulfide in the presence of a catalyst. The catalyst used in Mobil-direct-oxidation process contains titanium dioxide ($TiO_2$). The catalyst used in Super-Claus Process is an active mixture of iron and chromium oxides deposited on an alpha-alumina support. These dry type Claus TGT processes are simple and economical; however, the chromium atom contained in the catalyst is a toxic substance.

In our experimental studies, it was found that vanadium and magnesium mixed catalyst can effectively oxidize hydrogen sulfide to elemental sulfur (U.S. Pat. No. 5,653,953 and Taiwan Patent Published No. 92615) However, as the content of magnesium in the mixed catalyst is increased, the yield of sulfur will be significantly reduced.

Therefore, a major object of the present application is to improve the defects encountered with the prior arts.

SUMMARY OF THE INVENTION

An object of the present invention is to provide a method for oxidizing hydrogen sulfide to elemental sulfur.

Another object of the present invention is to provide a method for recovering elemental sulfur from a gas mixture containing hydrogen sulfide.

Another further object of the present invention is to provide a catalyst adapted to be used to oxidize hydrogen sulfide to elemental sulfur.

According to the present invention, the method includes a step of oxidizing hydrogen sulfide to elemental sulfur in the presence of a catalyst including an antimony-containing substance and a vanadium-and-magnesium-containing material.

In accordance with one aspect of the present invention, the antimony-containing substance is one selected from a group consisting of metallic antimony, antimonic oxide, antimonic sulfide, antimonic halogenide, antimonic carbide, antimonic hydroxide, antimonic hydride, antimonous oxychloride, antimonous sulfate, and antimonate. Preferably, the antimony-containing substance is antimonous oxide ($Sb_2O_3$) or antimony tetroxide ($\alpha$-$Sb_2O_4$).

The vanadium-and-magnesium-containing material is one selected from a group consisting of metallic vanadium and magnesium, vanadium and magnesium oxides, vanadium and magnesium sulfides, vanadium and magnesium halogenides, and a mixture thereof. Preferably, the vanadium-and-magnesium-containing material is magnesium pyrovanadate ($Mg_3V_2O_8$) or $Mg_2V_2O_7$.

The vanadium-and-magnesium-containing substance is deposited on a carrier in a form selected from a group consisting of monolith, particle, pellet, and porous carrier. The porous carrier is one selected from a group consisting of alumina, silica, aluminum-and-silicon-containing compound, zeolite, titanium oxide, and zirconium oxide.

Preferably, the molar ratio of antimony of the antimony-containing substance to vanadium and magnesium of the vanadium-and-magnesium-containing material is ranged from 0.01:1 to 100:1, preferably from 0.1:1 to 10:1.

The oxidizing reaction is performed at a temperature ranged between 50° C. and 400° C., preferable 100–350° C.

The oxidizing reaction is performed at a pressure ranged from 0.1 to 50 atm, preferably 1–10 atm.

The present invention will be further illustrated by the following examples.

DETAILED DESCRIPTION OF THE PREFERRED EMBODIMENT

The present invention will now be described more detailedly with reference to the following embodiments. It is to be noted that the following descriptions of the preferred embodiments of this invention are presented herein for the purpose of illustration and description only. It is not intended to be exhaustive or to be limited to the precise form disclosed.

The present invention provides a method for oxidizing hydrogen sulfide to elemental sulfur, especially for recovering elemental sulfur from a gas mixture containing hydrogen sulfide. In order to understand the present invention in detail, some examples are illustrated as follows.

EXAMPLE 1

Mechanically Mixed Catalyst Comprising Antimony, Vanadium, and Magnesium

In this preferred embodiment, the catalyst comprising antimony, vanadium, and magnesium is prepared by mechanically mixing $Mg_3V_2O_8$ catalyst and $\alpha$-$Sb_2O_4$ catalyst. The preparing process is divided into three steps, A, B, and C below.

Step A: Preparation of $Mg_3V_2O_8$ Catalyst (1) 12.82 g $Mg(NO_3)_2 \cdot 6H_2O$ is dissolved in 25 ml distilled water.

(2) 3.899 g $NH_4VO_3$ is dissolved in 175 ml hot distilled water and is added to the solution of Step (1).

(3) 3.522 g citric acid is added to the obtained solution of Step (2).

(4) The obtained solution of Step (3) is heated to become a slurry and then dried at 100° C. for 16 hours. Thereafter, the resulting product is dried at 110° C. for 24 hours and then calcined at 300° C. for 16 hours.

(5) Finally, the product is calcined at 600° C. for 20 hours and then screened to obtain the particles of 20–40 mesh number. The resulting particles are analyzed by X-ray diffraction and identified as $Mg_3V_2O_8$.

Step B: Preparation of $\alpha$-$Sb_2O_4$ Catalyst $Sb_2O_3$ is calcined at 500° C. for 20 hours and then screened to obtain the particles $\alpha$-$Sb_2O_4$ of 20–40 mesh number.

Step C: Mechanical Mixture of $Mg_3V_2O_8$ and $\alpha$-$Sb_2O_4$ 1 g $Mg_3V_2O_8$ prepared from Step A and 1 g $\alpha$-$Sb_2O_4$ prepared from Step B ($Mg_3V_2O_8/(Mg_3V_2O_8+Sb_2O_4)=0.5$) are added to 50 ml pentane and is stirred at room temperature for 3 minutes. Thereafter, the mixture is evaporated under vacuum and is then dried at 80° C. for 12 hours to obtain the mixed catalyst comprising antimony, vanadium, and magnesium. Because the mixed catalyst has never been calcined, the vanadium-and-magnesium-containing compound and antimony-containing compound are physically mixed together in the mixed catalyst.

Selective Oxidation of Hydrogen Sulfide 0.5 g mixed catalyst of Step C in the form of 10–20 mesh number particles is packed into a tubular glass reactor having an inner diameter of 8 mm, an outer diameter of 10 mm, and a length of 80 cm. The reaction temperature is controlled by an electrical heater installed around the reactor. The catalyst bed is presulfurized at 250° C. for at least 8 hours by introducing a 9 vol % hydrogen sulfide gas mixture into the reactor until a gaseous reaction product leaving the reactor had a stable hydrogen sulfide concentration. After the presulfurization step, a gaseous feed stream consisting of 1 vol % hydrogen sulfide, 5 vol % oxygen, and 94 vol % nitrogen is then introduced into the reactor at 100 ml/min. The reaction product exiting the reactor is introduced into a gas-solid separator which is connected to an outlet of the reactor and maintained at 25° C., in which the reaction product is separated into a solid product and a gaseous product. The composition of the gaseous product is analyzed by gas chromatography. The reaction conditions and results are listed in Table 1, in which the conversion (%) is defined as the mole of hydrogen sulfide reacted per mole of hydrogen sulfide in the feed stream, and the selectivity is defined as the mole of elemental sulfur formed per mole of the reacted hydrogen sulfide. As the selectivity is lower than 100%, it means that there is sulfur dioxide appeared in the gas exiting the gas-solid separator.

TABLE 1

Catalytic performance of mechanically mixed catalyst comprising antimony, vanadium, and magnesium

| Temperature (° C.) | Conversion (%) | Selectivity (%) | Yield of sulfur (%) |
|---|---|---|---|
| 200 | 17.4 | 100 | 17.4 |
| 250 | 49.2 | 100 | 49.2 |
| 300 | 92.9 | 99.8 | 92.7 |
| 310 | 97.6 | 97.0 | 94.6 |
| 320 | 99.5 | 94.2 | 93.8 |
| 330 | 99.8 | 80.6 | 80.4 |

EXAMPLE 2

Calcined Mixed Catalyst Comprising Antimony, Vanadium, and Magnesium

The mixed catalyst, comprising antimony, vanadium, and magnesium, used in this preferred embodiment is prepared by calcination of the mechanically mixed catalyst obtained from Step C of Example 1 at 600° C. for 144 hours. The reaction steps of selective oxidation of hydrogen sulfide are the same as those in Example 1. The reaction results are shown in Table 2.

TABLE 2

Catalytic performance of calcined mixed catalyst comprising antimony, vanadium, and magnesium

| Temperature (° C.) | Conversion (%) | Selectivity (%) | Yield of sulfur (%) |
|---|---|---|---|
| 200 | 46.9 | 100 | 46.9 |
| 250 | 93.2 | 100 | 93.2 |
| 270 | 98.9 | 100 | 98.9 |
| 280 | 99.6 | 99.0 | 98.7 |
| 290 | 99.9 | 96.5 | 96.3 |

It is found that the performance of the calcined mixed catalyst of this example is superior to that of Example 1. An excellent yield can be obtained under a lower temperature. The yield of elemental sulfur is up to 98.9% at 270° C.

Comparative Example 1

$Mg_3V_2O_8$ Catalyst

The preparation of the $Mg_3V_2O_8$ catalyst used in this comparative example is the same as that described in Step A of Example 1. The reaction steps of selective oxidation of hydrogen sulfide are the same as those in Example 1, except that the mixed catalyst comprising antimony, vanadium, and magnesium is replaced by $Mg_3V_2O_8$ catalyst. The reaction results are shown in Table 3.

TABLE 3

Catalytic performance of $Mg_3V_2O_8$ catalyst

| Temperature (° C.) | Conversion (%) | Selectivity (%) | Yield of sulfur (%) |
|---|---|---|---|
| 200 | 31.2 | 100 | 31.2 |
| 250 | 78.7 | 91.9 | 72.3 |
| 260 | 88.9 | 83.3 | 74.1 |
| 270 | 93.9 | 66.9 | 62.8 |
| 280 | 95.7 | 40.7 | 39.0 |

Comparative Example 2

$\alpha$-$Sb_2O_4$ Catalyst

The Preparation of the $\alpha$-$Sb_2O_4$ catalyst used in this comparative example is the same as that described in Step B of Example 1. The reaction steps of selective oxidation of hydrogen sulfide are the same as those in Example 1, except that the mixed catalyst comprising antimony, vanadium, and magnesium is replaced by $\alpha$-$Sb_2O_4$ catalyst. The reaction results are shown in Table 4.

TABLE 4

Catalytic performance of $\alpha$-$Sb_2O_4$ catalyst

| Temperature (° C.) | Conversion (%) | Selectivity (%) | Yield of sulfur (%) |
|---|---|---|---|
| 200 | 4 | 100 | 4 |
| 250 | 14.5 | 100 | 14.5 |

TABLE 4-continued

Catalytic performance of α-$Sb_2O_4$ catalyst

| Temperature (° C.) | Conversion (%) | Selectivity (%) | Yield of sulfur (%) |
|---|---|---|---|
| 300 | 54.3 | 100 | 54.3 |
| 330 | 72.9 | 91.1 | 66.4 |

From the data shown in Tables 1–4, the yield of the elemental sulfur (up to 98.9%), obtained after the selective oxidation of hydrogen catalyzed by the mixed catalyst comprising antimony, vanadium, and magnesium, is significantly superior to single α-$Sb_2O_4$ catalyst or $Mg_3V_2O_8$ catalyst (the highest yield is only 74.1%).

Example 3

Mechanically Mixed Catalyst Comprising Antimony, Vanadium, and Magnesium

In this preferred embodiment, the catalyst comprising antimony, vanadium, and magnesium is prepared by mechanically mixing $Mg_2V_2O_7$ catalyst and α-$Sb_2O_4$ catalyst. The preparing process is divided into three steps, A, B, and C.

Step A: Preparation of $Mg_2V_2O_7$ Catalyst (1) 12.82 g $Mg(NO_3)_2 \cdot 6H_2O$ is dissolved in 25 ml deionized water.

(2) 5.849 g $NH_4VO_3$ is dissolved in 175 ml hot water and the solution of Step (1) is added therein.

(3) 3.522 g citric acid is added to the solution of Step (2).

(4) The solution of Step (3) is evaporated to become a slurry and then dried at 100° C. for 16 hours. Thereafter, the product is dried at 110° C. for 24 hours and then calcined at 300° C. for 16 hours.

(5) Finally, the product is calcined at 600° C. for 15 hours and then screened to obtain the particles of 20–40 mesh number. The resulting particles are analyzed by X-ray diffraction and identified as $Mg_2V_2O_7$.

Step B: Preparation of α-$Sb_2O_4$ Catalyst

All steps are identical to those described in Step B of Example 1.

Step C: Mechanical Mixture of $Mg_2V_2O_7$ and α-$Sb_2O_4$ 1.4 g $Mg_2V_2O_7$ prepared from Step A and 0.47 g α-$Sb_2O_4$ prepared from Step B ($Mg_2V_2O_7/(Mg_2V_2O_7+Sb_2O_4$)=0.75) are added to 50 ml pentane and stirred at room temperature for 3 minutes. Thereafter, it is evaporated under vacuum and then dried at 80° C. for 12 hours to obtain the mixed catalyst comprising antimony, vanadium, and magnesium. Because the mixed catalyst has never been calcined, the vanadium-and-magnesium-containing compound and antimony-containing compound are physically mixed together in the mixed catalyst.

Selective Oxidation of Hydrogen Sulfide

The reaction steps are the same as those of Example 1 and the results are shown in Table 5.

TABLE 5

Catalytic performance of mechanically mixed catalyst comprising antimony, vanadium, and magnesium ($Mg_2V_2O_7/(Mg_2V_2O_7 + Sb_2O_4) = 0.75$)

| Temperature (° C.) | Conversion (%) | Selectivity (%) | Yield of sulfur (%) |
|---|---|---|---|
| 200 | 26.6 | 100 | 26.6 |
| 250 | 62.4 | 100 | 62.4 |
| 290 | 92.2 | 100 | 92.2 |
| 300 | 94.4 | 97.8 | 92.4 |
| 310 | 96.1 | 93.1 | 89.4 |
| 320 | 98.6 | 82.1 | 81.0 |

Comparative Example 3

$Mg_2V_2O_7$ Catalyst

The preparation of the $Mg_2V_2O_7$ catalyst used in this comparative Example 3 is the same as that described in Step A of Example 3. The reaction steps of selective oxidation of hydrogen sulfide are the same as those in Example 1, except that the mixed catalyst comprising antimony, vanadium and magnesium is replaced by $Mg_2V_2O_7$ catalyst. The reaction results are shown in Table 6.

TABLE 6

Catalytic performance of $Mg_2V_2O_7$ catalyst

| Temperature (° C.) | Conversion (%) | Selectivity (%) | Yield of sulfur (%) |
|---|---|---|---|
| 200 | 27.4 | 100 | 27.4 |
| 250 | 79.6 | 96.9 | 77.1 |
| 260 | 88.7 | 88.7 | 78.6 |
| 270 | 93.9 | 75.5 | 70.9 |
| 280 | 96.3 | 55.1 | 53.1 |

From all data shown in Tables 4–6, the yield of the elemental sulfur, obtained after the selective oxidation of hydrogen sulfide is catalyzed by the mixed catalyst ($Mg_2V_2O_7+Sb_2O_4$), is significantly superior to single α-$Sb_2O_4$ or single $Mg_2V_2O_7$ catalyst.

In conclusion, the present invention provides a noval method for recovering elemental sulfur from a gas mixture containing hydrogen sulfide by selective oxidation of hydrogen sulfide in the presence of a catalyst comprising antimony, vanadium, and magnesium. The catalytic performance of the mixed catalyst according to the present invention is superior to that of single α-$Sb_2O_4$, $Mg_3V_2O_8$, or $Mg_2V_2O_7$. Not only does the mixed catalyst greatly increase the recovering yield of elemental sulfur, but it meets the requirement of environmental protection.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for oxidizing hydrogen sulfide to elemental sulfur comprising a step of oxidizing hydrogen sulfide to elemental sulfur at a temperature ranged from about 210° C. to about 320° C. in the presence of a catalyst including vanadium-and-magnesium-containing oxide and antimony oxide wherein said catalyst molar ratio of antimony of said antimony oxide to vanadium and magnesium of said vanadium-and magnesium-containing oxide is ranged from 1:10 to 10:1.

2. The method according to claim 1, wherein said antimony oxide is one of antimonous oxide ($Sb_2O_3$) and antimony tetroxide ($\alpha\text{-}Sb_2O_4$).

3. The method according to claim 1 wherein said vanadium-and-magnesium-containing substance is deposited on a carrier in a form selected from a group consisting of monolith, particle, pellet, and porous carrier.

4. The method according to claim 3 wherein said porous carrier is one selected from a group consisting of alumina, silica, aluminum-and-silicon-containing compound, zeolite, titanium oxide, and zirconium oxide.

5. The method according to claim 1, wherein said vanadium-and-magnesium-containing oxide is one of magnesium pyrovanadate ($Mg_3V_2O_8$) and $Mg_2V_2O_7$.

6. The method according to claim 1 wherein the oxidizing reaction is performed at a pressure ranged from 0.1 to 50 atm.

7. The method according to claim 1 wherein the oxidizing reaction is performed at a pressure ranged from 1 to 10 atm.

8. A method for recovering elemental sulfur from a gas mixture containing hydrogen sulfide, comprising:

oxidizing hydrogen sulfide to elemental sulfur at a temperature ranged from about 210° C. to about 320° C. in the presence of a catalyst including vanadium-and-magnesium-containing oxide and antimony oxide wherein said catalyst molar ratio of antimony of said antimony oxide to vanadium and magnesium of said vanadium-and magnesium-containing oxide is ranged from 1:10 to 10:1, and recovering the elemental sulfur.

9. The method according to claim 8, wherein said antimony oxide is one of antimonous oxide ($Sb_2O_3$) and antimony tetroxide ($\alpha\text{-}Sb_2O_4$).

10. The method according to claim 8 wherein said vanadium-and-magnesium-containing substance is deposited on a carrier in a form selected from a group consisting of monolith, particle, pellet, and porous carrier.

11. The method according to claim 10 wherein said porous carrier is one selected from a group consisting of alumina, silica, aluminum-and-silicon-containing compound, zeolite, titanium oxide, and zirconium oxide.

12. The method according to claim 8, wherein said vanadium-and magnesium-containing oxide is one of magnesium pyrovanadate ($Mg_3V_2O_8$) and $Mg_2V_2O_7$.

13. The method according to claim 8 wherein the oxidizing reaction is performed at a pressure ranged from 0.1 to 50 atm.

* * * * *